US 7,586,998 B1

(12) United States Patent
Jones et al.

(10) Patent No.: US 7,586,998 B1
(45) Date of Patent: Sep. 8, 2009

(54) METHOD AND APPARATUS FOR RECEIVER PULSE RESPONSE DETERMINATION

(75) Inventors: Christopher Scott Jones, Portland, OR (US); Jeffrey Lee Sonntag, Portland, OR (US); John Theodore Stonick, Portland, OR (US); Daniel Keith Weinlader, Allentown, PA (US)

(73) Assignee: Synopsys, Inc., Mountain View, CA (US)

( * ) Notice: Subject to any disclaimer, the term of this patent is extended or adjusted under 35 U.S.C. 154(b) by 626 days.

(21) Appl. No.: 10/978,610

(22) Filed: Nov. 1, 2004

(51) Int. Cl.
*H04L 27/00* (2006.01)

(52) U.S. Cl. .................. 375/316; 375/346; 375/348; 455/63.1; 455/296

(58) Field of Classification Search ........... 375/316, 375/346, 348; 455/63.1, 296
See application file for complete search history.

(56) References Cited

U.S. PATENT DOCUMENTS

2003/0081697 A1* 5/2003 Little ....................... 375/317
2004/0156293 A1* 8/2004 Pozidis et al. ............. 369/59.22
2006/0002688 A1* 1/2006 Coene et al. ............... 386/124

* cited by examiner

*Primary Examiner*—David C Payne
*Assistant Examiner*—Leila Malek
(74) *Attorney, Agent, or Firm*—Park, Vaughan & Fleming LLP

(57) ABSTRACT

A pulse response for a receiver, as an array PR, is found from the receiver's symbol stream.

For a continuous stream of arbitrary data, a value of the array PR[k] can be determined from the signal levels of the symbols received. The stream of received data is input to a FIFO. Between the first and last locations of the FIFO is the symbol referred to herein as $D_n$. Symbols located in the FIFO before $D_n$ are referred to as $D_{n-x}$. Symbols located in the FIFO after $D_n$ are referred to as $D_{n+x}$. $D_n$ differs from the other FIFO symbols in that its signal level can be measured with an adjustable error slicer.

The ISI effect of any $D_{n-k}$ upon $D_n$ can be measured, and thus any PR[k] measured, by measuring the average signal level of $D_n$ when only certain types of data streams occur in the FIFO.

7 Claims, 19 Drawing Sheets

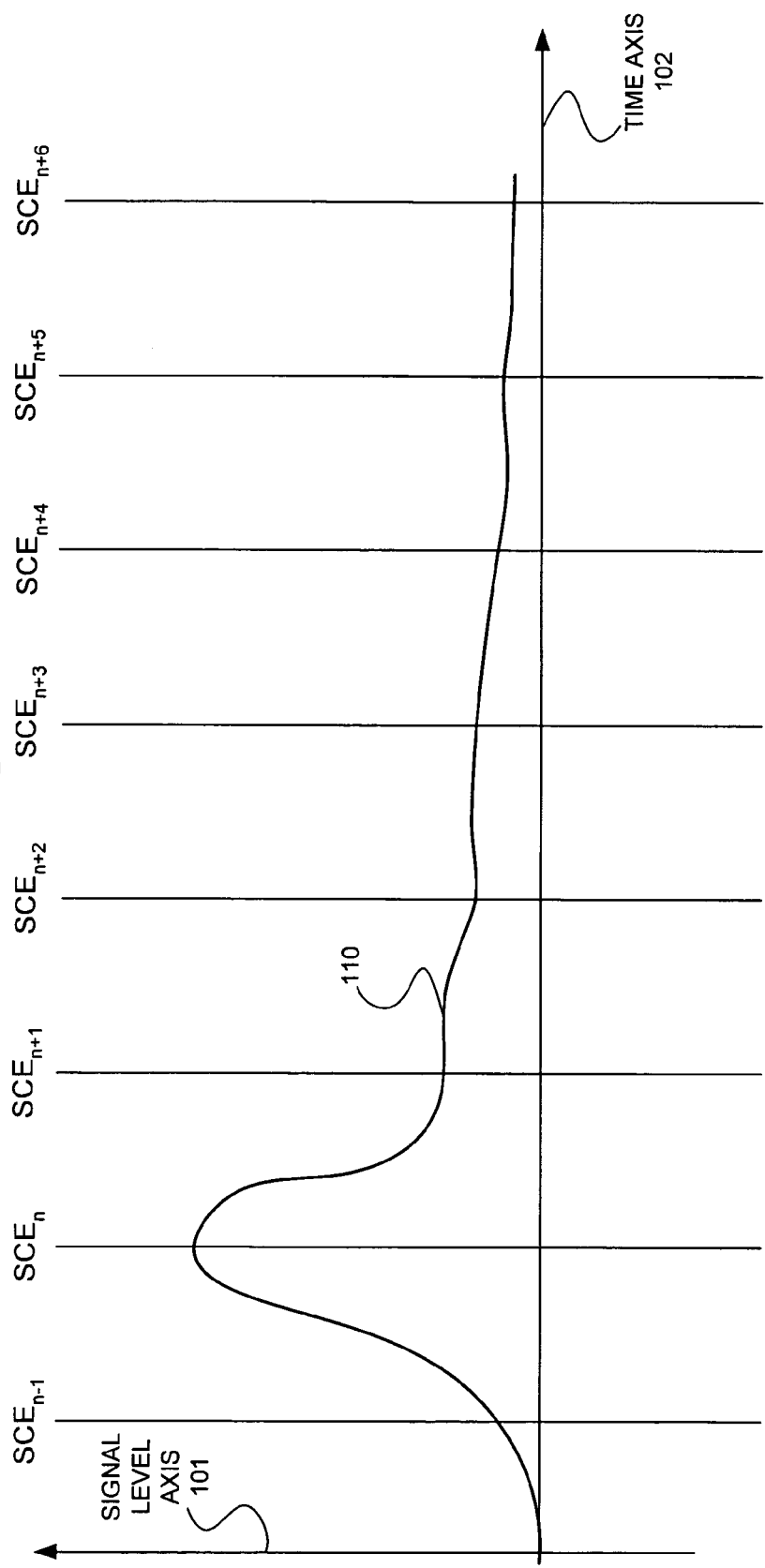

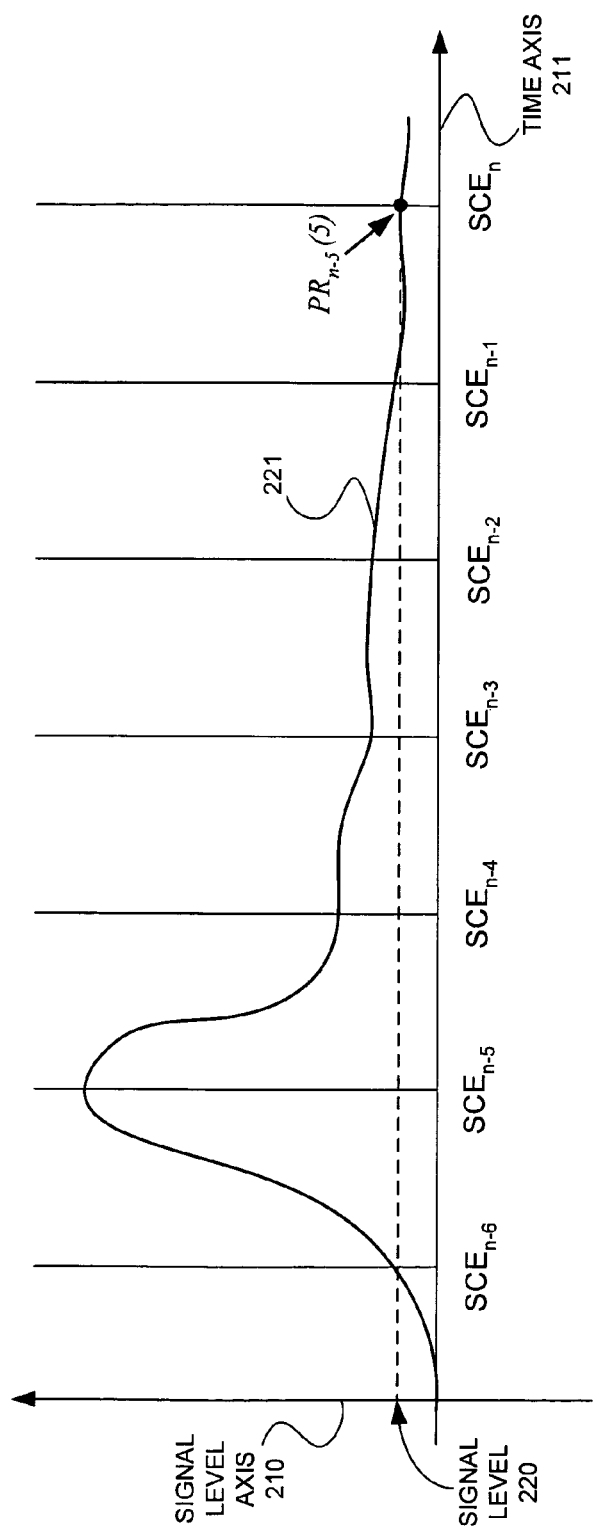

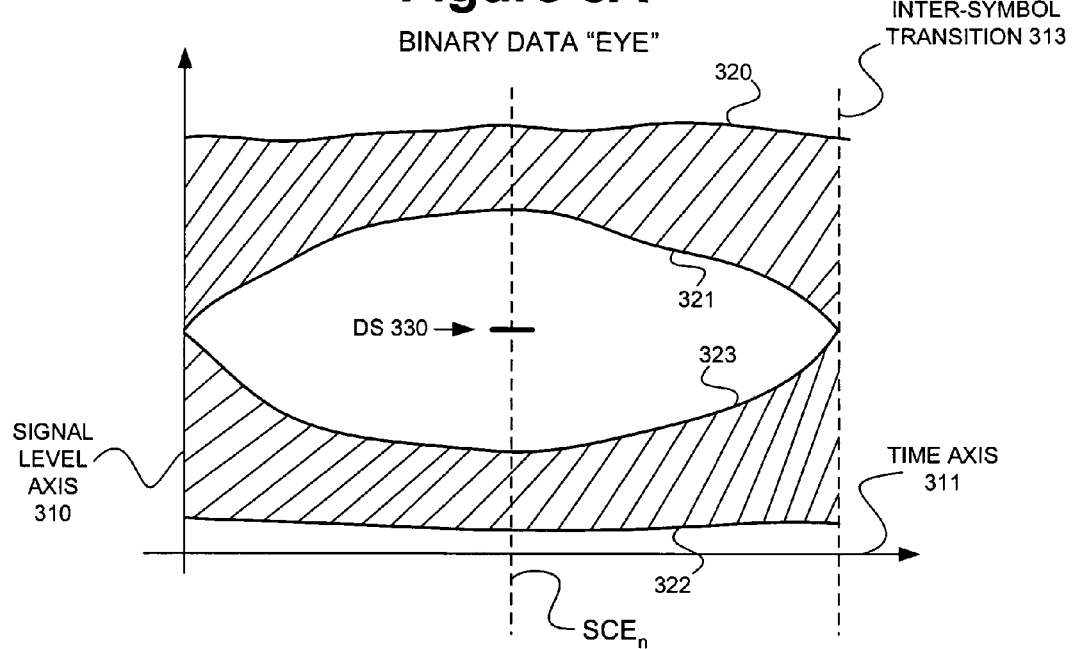
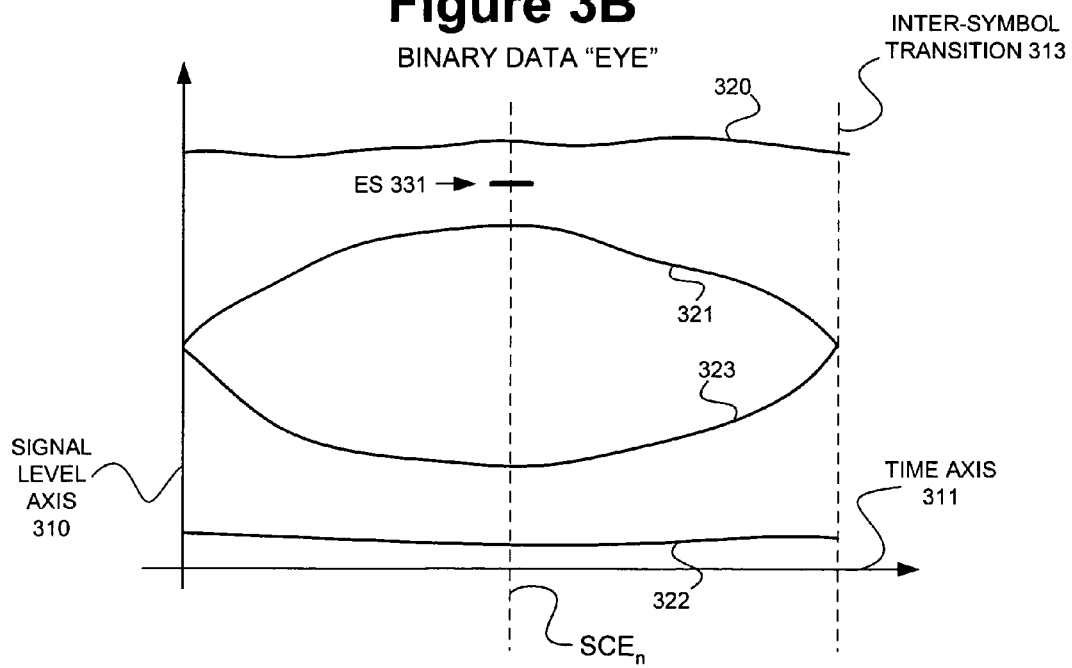

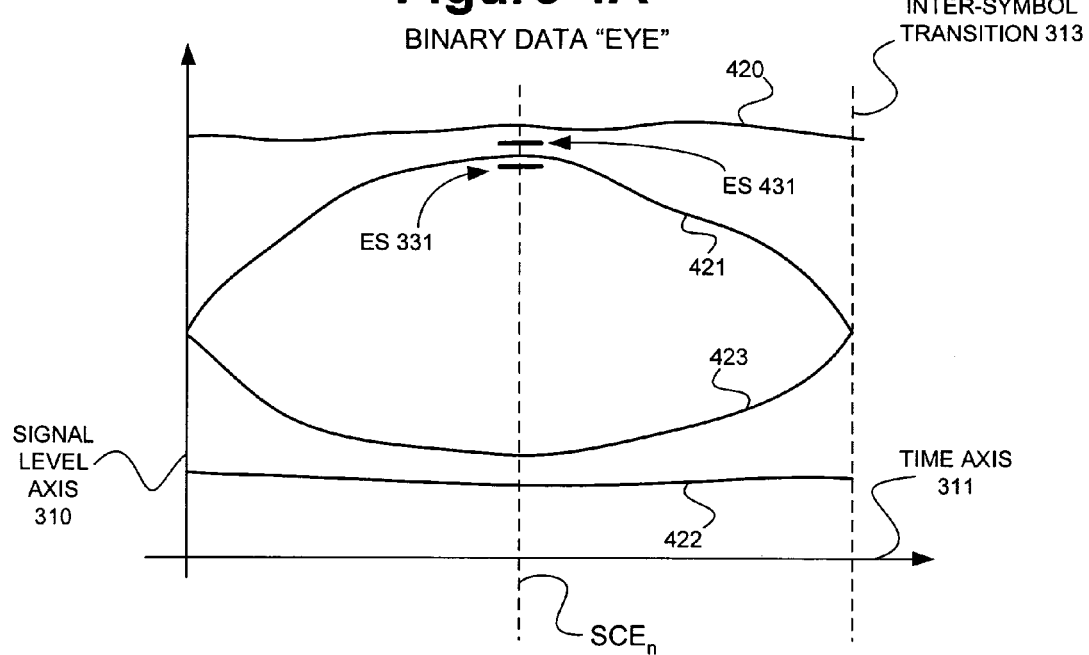
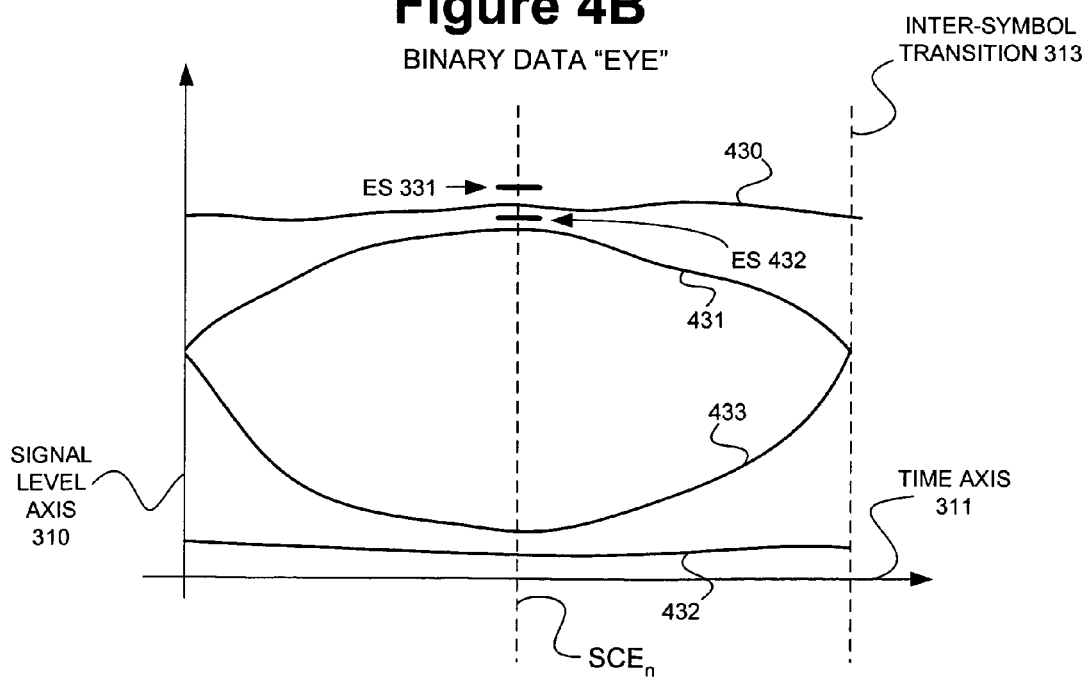

Figure 6A

```
1   /* SYMBOLIC DEFINITIONS FOLLOW */
2
3   /* define number of PR_F values to be determined */
4   #define PR_F_POINTS  7
5
6   /* define number of PR_B values, minus one, to be determined */
7   #define PR_B_POINTS  2
8
9   /* define number of adjustment to error slicer threshold in converging on
10  average value of masked-for subset of signal values for D_n */
11  #define NUM_ES_ADJS  100
12
13  /* define number of signal values for D_n upon which a single adjustment
14  to error slicer is based. */
15  #define NUM_SAMPLES_TO_ACCUM_OVER  1000
16
17  /* used to define a value in pattern_to_match_bk or pattern_to_match_bk
18  that matches any data slicer value */
19  #define MATCH_ANY_SYMBOL  10
20
21  /* define logical values for expressing results of comparing data slicer
22  values to patterns they are to match */
23  #define MATCH  1
24  #define NO_MATCH  0
25
26  /* Define the stepsize for each adjustment to the error slicer's threshold.
27  For purposes of example only, each 10 unit change of error_slicer_thresh can
28  be regarded as a 1 mV change in the error slicer's threshold. */
29  #define ES_DELTA  10
```

Figure 6B

```
1   /* GLOBAL VARIABLE DECLARATIONS FOLLOW */
2
3   /* Declare an array called PR_F, of PR_F_POINTS floating point numbers, to
4   hold the PR from the time the pulse is sampled and going forward. PR_F[0] is
5   the temporally earliest element and PR_F[PR_F_POINTS-1] is the latest */
6   float PR_F[PR_F_POINTS];
7
8   /* Declare an array called PR_B, of PR_B_POINTS floating point numbers, to
9   hold the PR going backward from the time the pulse is sampled. PR_B[1]
10  is the temporally latest element (that is still earlier than the sampled pulse)
11  and PR_B[PR_B_POINTS-1] is the earliest */
12  float PR_B[PR_B_POINTS];
13
14  /* the error slicer is set to whatever level this variable is set to */
15  int error_slicer_thresh;
16
17  /* Following are updated by function wait_for_symbol_clock:
18  1. "data_slicer_values_bk" is a queue where
19  data_slicer_values_bk[PR_F_POINTS-1] is $D_{n-(PR\_F\_POINTS-1)}$
20   and data_slicer_values_bk[0] is $D_{n-0}$.
21
22  2. "data_slicer_values_fw" is a queue where
23  data_slicer_values_fw[1] is $D_{n+1}$ and data_slicer_values_fw[PR_B_POINTS-1]
24  is $D_{n+(PR\_B\_POINTS-1)}$.  */
25  int data_slicer_values_bk[PR_F_POINTS];
26  int data_slicer_values_fw[PR_B_POINTS];
27  int error_slicer_value;
28
29  /* data_slicer_values_bk must match, element for element,
30  pattern_to_match_bk, and data_slicer_values_fw must match, element for
31  element, pattern_to_match_fw, in order for an error slicer value to be
32  accumulated by e_to_s_correlation */
33  int pattern_to_match_bk[PR_F_POINTS];
34  int pattern_to_match_fw[PR_B_POINTS];
```

Figure 6C

```
1   /* finds a PR_F value for each element of PR_F array */
2   For (k=0; k < PR_F_POINTS; ++k)
3        find_PR_value (k, 1)
4   /* finds a PR_B value for each element of PR_B array */
5   For (k=1; k < PR_B_POINTS; ++k)
6        find_PR_value (k, 0)
```

Figure 6D

```
1   /* Given a location "k" of a PR array, find_PR_value finds its
2   PR value. If dir == 1, then element k of PR_F is determined, while
3   if dir == 0, then element k of PR_B is found */
4   find_PR_value (k, dir)
5   {
6   if (k != 0)
7   {
8       /* adjust_error_slicer adjusts the error slicer threshold to the average
9       level of a set of Dn signals masked for either Dn-k being of value one, or
10      Dn+k being of value one. Whether Dn-k or Dn+k is masked for depends on
11      the value of "dir" parameter. The value of one, that Dn-k or Dn+k is limited
12      to, is selected by the third parameter. In addition to masking for a
13      particular value of Dn-k or Dn+k, adjust_error_slicer is constructed to
14      always mask for Dn being of value one. */
15      adjust_error_slicer (k, dir, 1);
16
17      /* level for error slicer, found by above application of adjust_error_slicer,
18      is saved in signal_level1 */
19      signal_level1 = error_slicer_thresh;
20
21      /* adjust_error_slicer adjusts the error slicer threshold to the average
22      level of set of Dn signals masked for Dn-k or Dn+k being of value zero and
23      Dn being of value one. */
24      adjust_error_slicer (k, dir, 0);
25
26      /* level for error slicer, found by above application of adjust_error_slicer,
27      is saved in signal_level10 */
28      signal_level0 = error_slicer_thresh;
29
30      if (dir == 1)
31          PR_F[k] = (signal_level1 - signal_level0) / 2;
32      else /* dir == 0 */
33          PR_B[k] = (signal_level1 - signal_level0) / 2;
34   }
35   else /* k == 0 */
36   {
37      adjust_error_slicer (k, dir, 1);
38      PR_F[0] = error_slicer_thresh;
39      PR_B[0] = error_slicer_thresh;
40   }
41   } /* end find_PR_value */
```

Figure 6E

```
1   adjust_error_slicer (k, dir, symbol_to_hold_to)
2   {
3
4   int k;
5   int e_to_s_corr;
6   int samples_to_accum_over;
7   int index;
8
9   /* initialize pattern_to_match to match any symbol at all positions */
10  For (index=0; index < PR_F_POINTS; ++index)
11       pattern_to_match_bk[index] = MATCH_ANY_SYMBOL;
12  For (index=0; index < PR_B_POINTS; ++index)
13       pattern_to_match_fw[index] = MATCH_ANY_SYMBOL;
14
15  if (dir == 1)
16  {
17       /* arbitrarily fix Dn at value one for all subsets of Dn that may be specified
18       by the parameters to adjust_error_slicer. */
19       pattern_to_match_bk[0] = 1;
20
21       /* mask for those Dn signals where Dn-k encodes symbol_to_hold_to */
22       if (k != 0)
23            pattern_to_match_bk[k] = symbol_to_hold_to;
24
25       /* other than masking for Dn and Dn-k being particular values, whether other
26       bits, prior to or after Dn, are masked for a particular value is optional.
27       Following is an example optimization, where, so long as k is not 0 or 1,
28       Dn-1 and Dn+1 are also held constant to make Dn measurement more
29       accurate */
30       if ( (k != 0) && (k !=1) )
31       {
32            pattern_to_match_bk[1] = 1;
33            pattern_to_match_fw[1] = 1;
34       }
35
36  } /* end if */
37
38  /* adjust_error_slicer is continued in Figure 6F */
```

Figure 6F

```
1   else /* dir == 0 */
2   {
3       /* arbitrarily fix D_n at value one for all subsets of D_n that may be specified
4       by the parameters to adjust_error_slicer. */
5       pattern_to_match_fw[0] = 1;
6
7       /* measure D_n with D_{n+k} held to symbol_to_hold_to */
8       if (k != 0)
9           pattern_to_match_fw[k] = symbol_to_hold_to;
10
11      /* other than masking for D_n and D_{n+k} being particular values, whether other
12      bits, after or prior to D_n, are masked for a particular value is optional.
13      Following is an example optimization, where, so long as k is not 0 or 1,
14      D_{n-1} and D_{n+1} are also held constant to make D_n measurement more
15      accurate */
16      if ( (k != 0) && (k !=1) )
17      {
18          pattern_to_match_bk[1] = 1;
19          pattern_to_match_fw[1] = 1;
20      }
21
22  } /* end else */
23
24  /* Error slicer threshold is converged to average value for masked subset of D_n.
25  Each adjustment to threshold based upon a call to "e_to_s_correlation." */
26  For (index=0; index < NUM_ES_ADJS; ++index)
27  {
28      e_to_s_corr = e_to_s_correlation( );
29
30      if ( e_to_s_corr > upper_bound )
31          error_slicer_thresh = error_slicer_thresh + ES_DELTA;
32
33      if ( e_to_s_corr < lower_bound )
34          error_slicer_thresh = error_slicer_thresh - ES_DELTA;
35  }
36
37  } /* end adjust_error_slicer */
```

Figure 6G

```
1   /* Over a number of values of D_n, that meet the masking requirement set by
2   pattern_to_match_bk and pattern_to_match_fw, values of the error slicer are
3   accumulated. If the error slicer is set to the average level of the masked set of
4   D_n, accumulated error slicer values will tend towards zero. The number of
5   error slicer values accumulated is determined by
6   NUM_SAMPLES_TO_ACCUM_OVER. */
7   e_to_s_correlation ( )
8   {
9
10  index=0
11  while (index < NUM_SAMPLES_TO_ACCUM_OVER)
12  {
13      /* "wait_for_symbol_clock" waits for a symbol clock and then
14      updates global variables data_slicer_values_bk, data_slicer_values_fw
15      and error_slicer_value. */
16      wait_for_symbol_clock();
17
18      /* Current contents of data_slicer_values_bk is compared with
19      pattern_to_match_bk. */
20      result_bk = compare_bk( );
21
22      /* Current contents of data_slicer_values_fw is compared with
23      pattern_to_match_fw. */
24      result_fw = compare_fw( );
25
26      /* If both above calls to "compare" return the value "MATCH" then the
27      latest D_n is part of the masked-for subset and the corresponding error
28      slicer value is accumulated. */
29      if ( (result_bk == MATCH) && (result_fw == MATCH) )
30      {
31          index = index +1;
32          e_to_s_corr = e_to_s_corr + error_slicer_value;
33      }
34  } /* end loop */
35
36  return e_to_s_corr;
37
38  } /end e_to_s_correlation */
```

Figure 6H

```
1   compare_bk ( )
2   {
3
4   result = MATCH
5
6   For (index=0; index < PR_F_POINTS; ++index)
7   {
8       if (pattern_to_match_bk[index] != MATCH_ANY_SYMBOL)
9           if ( pattern_to_match_bk[index] != data_slicer_values_bk[index] )
10              result = NO_MATCH;
11  }
12
13  return result;
14
15  }
```

Figure 6I

```
1   compare_fw ( )
2   {
3
4   result = MATCH
5
6   For (index=0; index < PR_B_POINTS; ++index)
7   {
8       if (pattern_to_match_fw[index] != MATCH_ANY_SYMBOL)
9           if ( pattern_to_match_fw[index] != data_slicer_values_fw[index] )
10              result = NO_MATCH;
11  }
12
13  return result;
14
15  }
```

METHOD AND APPARATUS FOR RECEIVER PULSE RESPONSE DETERMINATION

FIELD OF THE INVENTION

The present invention relates generally to the determination of a pulse response, and more particularly to the determination of a pulse response in a receiver.

BACKGROUND OF THE INVENTION

For data transmission systems (DTSs), measurement of the channel's pulse response, at a receiver of the DTS, is well known as having many important uses. Such uses include, but are not limited to, the design or maintenance of DTSs.

Use of additional test equipment, however, to measure a pulse response at a receiver can pose several disadvantages. First, the physical packaging, of the system whose receiver circuits are to be monitored, can be very dense and not admit of the physical insertion of a probe. Second, for high speed data transfer, the probe itself can significantly change the characteristics of the channel and therefore the analog waveform to be measured.

It would therefore be desirable to provide an alternative to the use of additional test equipment that can be connected in dense packaging environments and/or will not significantly change channel characteristics.

It would also be desirable to provide a technique for measurement of a receiver's pulse response that can be utilized while the receiver continues to receive data.

SUMMARY OF THE INVENTION

The present invention relates to determining a pulse response for a receiver from its symbol stream. If implemented with appropriate hardware, the pulse response can be determined without interrupting normal operation of the receiver.

The following discussion will focus on determining a pulse response where the symbol stream is binary.

An array of discrete pulse response values, PR, can be referred to as PR[k], where k varies from a negative to a positive integer value. PR[0] can represent the peak value of the pulse response. In general, the time of PR[0] is the optimal time to sample the symbol, that produced the PR, for its information content. Values of PR[k], accessed by k greater than zero, can represent temporally post-peak values of the pulse response. Values of PR[k], accessed by k less than zero, can represent temporally pre-peak values of the pulse response.

The symbols of a symbol stream can be labeled in order to show the impact of the pulse response, for a symbol $D_n$, upon its surrounding symbols. Symbol $D_n$ is sampled when its pulse response, at the receiver, is PR[0]. The amplitude of $D_n$'s impact on the next symbol, $D_{n+1}$, is determined by PR[1]. The amplitude of $D_n$'s impact on the prior symbol, $D_{n+1}$, is determined by PR[−1]. Particularly in a high-speed DTS, the pulse response of the channel can cause each symbol $D_n$ to have a measurable ISI effect across several of its succeeding and preceding symbols. In an example pulse response, the pulse response of a symbol $D_n$ is shown as creating measurable ISI for the six following symbols $D_{n+1}$ to $D_{n+6}$ and for the preceding symbol $D_{n-1}$. Such ISI can be measured, and the pulse response that created such ISI derived, as follows.

Given the example pulse response, the signal level of a symbol $D_n$ is influenced by the ISI of its six preceding symbols $D_{n-6}$ to $D_{n-1}$ and one of its following symbols $D_{n+1}$. The influence of symbol $D_{n-5}$, for example, upon $D_n$ is of magnitude PR[5]. The specific ISI effect of $D_{n-5}$ upon $D_n$ can be measured, and thus PR[5] measured, by measuring the average signal level of $D_n$ when only certain types of data streams occur.

Expressed more generally, the specific ISI effect of any $D_{n-k}$ upon $D_n$ can be measured, and thus any PR[k] measured, by measuring the average signal level of $D_n$ when only certain types of data streams occur.

For a continuous stream of arbitrary data, a value of the array PR[k] can be determined, as follows, from the signal levels of the symbols received. It will be assumed that the stream of received data is input to a FIFO. A data slicer or slicers, for detecting the correct value of each symbol received, can provide the input to the FIFO's first location. With each new input to the FIFO's first location, the symbols already in the FIFO shift towards the FIFO's last location. Between the first and last locations of the FIFO is the "present" symbol referred to herein as $D_n$. Symbols in the FIFO that are located before $D_n$ (i.e., they are closer to the FIFO's first location than $D_n$), are referred to as $D_{n-x}$. Symbols in the FIFO that are located after $D_n$ (i.e., they are closer to the FIFO's last location than $D_n$), are referred to as $D_n+x$. $D_n$ differs from the other FIFO symbols, that are before or after it, in that the signal level of $D_n$ can be measured with an additional adjustable slicer referred to herein as an "error slicer."

A general notation, for representing subsets of the symbols $D_n$, is as follows. Assume the FIFO has "before_$D_n$" locations before $D_n$ and "after_$D_n$" locations after $D_n$. Specifying a subset of symbols $D_n$, in terms of every location of the FIFO having a particular symbol type, can be expressed as follows:

$\{D_n:$ $D_{n-before\_Dn}$=symbol_type_indicator$_{n-before\_Dn}$, $D_{n-(before\_Dn-1)}$=symbol_type_indicator$_{n-(before\_Dn-1)}$, . . .

$D_{n-1}$=symbol_type_indicator$_{n-1}$, $D_n$=symbol_type_indicator$_n$, $D_{n+1}$=symbol_type_indicator$_{n+1}$, . . .

$D_{n+after\_Dn}$=symbol_type_indicator$_{n+after\_Dn}\}$

Where the symbol stream is binary, each "symbol_type_indicator" can be of value 1 or 0.

In general, determining whether the pattern in the FIFO meets certain criteria, for being a member of a subset, can also be referred to herein as "masking" the FIFO for the criteria sought. Finding the average signal level of a subset by, for example, appropriately adjusting an error slicer, can be represented by application of an Adjustable Slicer Level (ASL) function to the subset. In equation form, such application of ASL can be represented by prefixing a subset specification with "ASL."

A discussion of how an error slicer can be used to measure the average signal level of a subset is presented.

Using the above-defined notation, PR[0] can be found by solving the following equation:

$$PR[0]=ASL\ \{D_n:D_n=1\} \qquad \text{Equation 1.1}$$

PR[k], where k is not zero, can be found by the following equation:

$$PR[k]=(ASL\{D_n:D_n=1\})-(ASL\{D_n:D_n=1,\ D_{n-k}=1\}) \qquad \text{Equation 1.2}$$

PR[k], where k is not zero, can also be found by the following:

$$PR[k]=[(ASL\{D_n:D_n=1, D_{n-k}=1\})-(ASL\{D_n:D_n=1, D_{n-k}=0\})]/2 \quad \text{Equation 1.3}$$

Equation 1.3 can have an advantage of greater signal-to-noise ratio than equation 1.2.

In addition to holding the masked-for value of $D_n$ constant, in both subsets of equation 1.3, it can also be desirable to hold other symbol positions constant.

Application of the function "ASL" to a subset can be accomplished by using an error slicer to test the actual signal levels of the subset. If the error slicer is tested with respect to a subset of sufficient size, and the error slicer is adjusted appropriately with respect to such testing, the error slicer can be made to converge on the average signal level of the symbols included in the subset.

The techniques discussed herein, while presented primarily in terms of application to binary symbol streams, can be readily applied to non-binary symbol streams.

For example, the techniques described herein can be applied to PAM4 and such application to PAM4 is presented.

A pseudocode procedure, for finding an array PR[k] from binary data, is presented.

An example hardware implementation for finding PR is also presented. Example functionality for hardware components is presented in terms of corresponding pseudocode. Alternatives, between having certain hardware components integrated on the same integrated circuit, or implemented separately, are discussed. An issue presented, in terms of whether to locate hardware components on the same integrated circuit, is the data processing speed of such components. Advantages, of locating the data and error slicers on the same integrated circuit, are discussed.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1A is an example pulse response of a channel.

FIGS. 2A and 2B show that the influence of symbol $D_{n-5}$, for example, upon $D_n$ is of magnitude PR[5].

FIGS. 3A and 3B show an example application of equation 1.1.

FIG. 4A shows only those signal traces for $D_n$ when $D_{n-k}$ is of symbol type one.

FIG. 4B shows only those signal traces for $D_n$ when $D_{n-k}$ is of symbol type zero.

FIGS. 6A-6I depict a pseudocode procedure for finding an array PR[k] from binary data.

DETAILED DESCRIPTION OF PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

TABLE OF CONTENTS TO DETAILED DESCRIPTION

1. Overview
   1.1. Average Signal Level Determination
   1.2. Example PR[0]
   1.3. Applying Equation 1.2 to Find PR[k]
   1.4. Applying Equation 1.3 to Find PR[k]

2. Application to Non-binary Data

3. Pseudocode

4. Hardware Implementation

5. Glossary of Selected Terms

1. Overview

The following discussion will focus on determining a pulse response where the symbol stream is binary.

Signal 110 of FIG. 1A is an example pulse response of a channel, where the pulse that generates the pulse response (carrying, for example, a bit of information) is optimally sampled, for its information content, at the time of a clock pulse n (the time of clock pulse n indicated in FIG. 1A by a vertical edge labeled "$SCE_n$," where SCE stands for "Sample Clock Edge"). FIG. 1A has a time axis 102 and a signal axis 101.

Figure 1B:
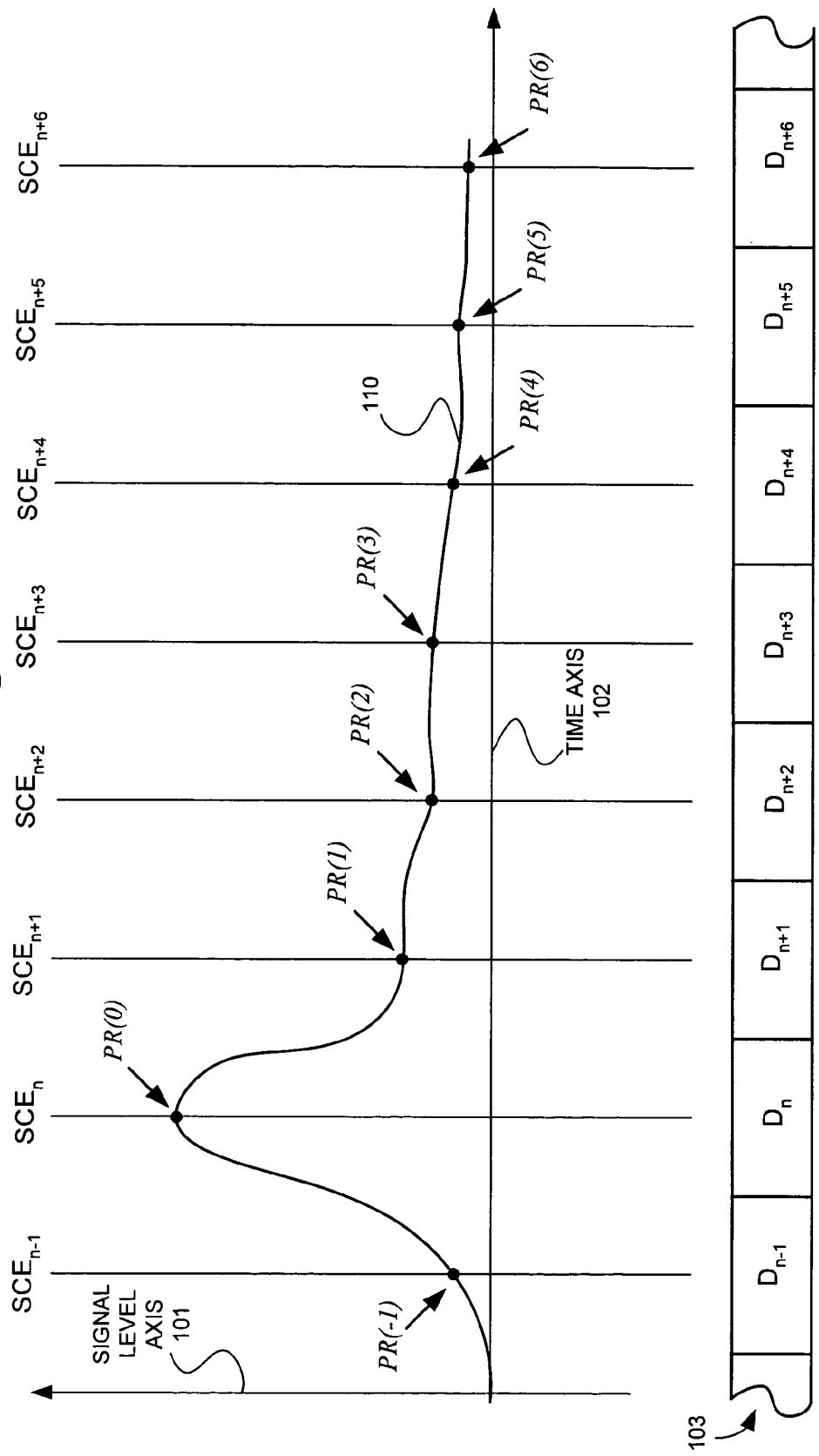
FIG. 1B shows the same pulse response 110 as FIG. 1A, except it is shown in relation to an array of discrete values.

FIG. 1B shows the same pulse response 110 as FIG. 1A, except it is shown in relation to an array of discrete values for the pulse response that have been determined from a continuous stream of arbitrary data. Specifically, a PR array can be referred to as PR[k], where k varies, in the example of FIG. 1B, from −1 to 6. More generally, PR[0] can represent the peak value of the pulse response. In general, the time of PR[0] is the optimal time to sample the symbol, that produced the PR, for its information content. Values of PR[k], accessed by k greater than zero, can represent temporally post-peak values of the pulse response. Values of PR[k], accessed by k less than zero, can represent temporally pre-peak values of the pulse response.

An example stream of arbitrary data, at any one point in time, is represented in FIG. 1B by data stream 103. The symbols of stream 103 are labeled in order to show the impact of the pulse response 110, for symbol $D_n$, upon its surrounding symbols. Symbol $D_n$ is sampled when its pulse response, at the receiver, is PR[0]. The amplitude of $D_n$'s impact on the next symbol, $D_{n+1}$, is determined by PR[1]. The amplitude of $D_n$'s impact on the prior symbol, $D_{n-1}$, is determined by PR[−1]. Particularly in a high-speed DTS, the pulse response of the channel can cause each symbol $D_n$ to have a measurable ISI effect across several of its succeeding and preceding symbols. In the example pulse response 110, the pulse response of a symbol $D_n$ is shown as creating measurable ISI for the six following symbols $D_{n+1}$ to $D_{n+6}$ and for the preceding symbol $D_{n-1}$. Such ISI can be measured, and the pulse response that created such ISI derived, as follows.

Figure 2C:
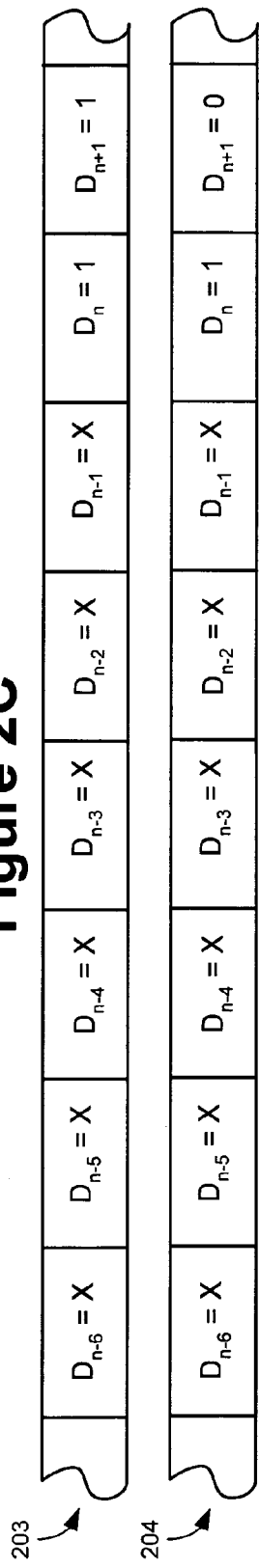
FIGS. 2C and 2D show that the influence of symbol $D_{n+1}$, as another example, upon $D_n$ is of magnitude PR[−1].
Figure 2D:
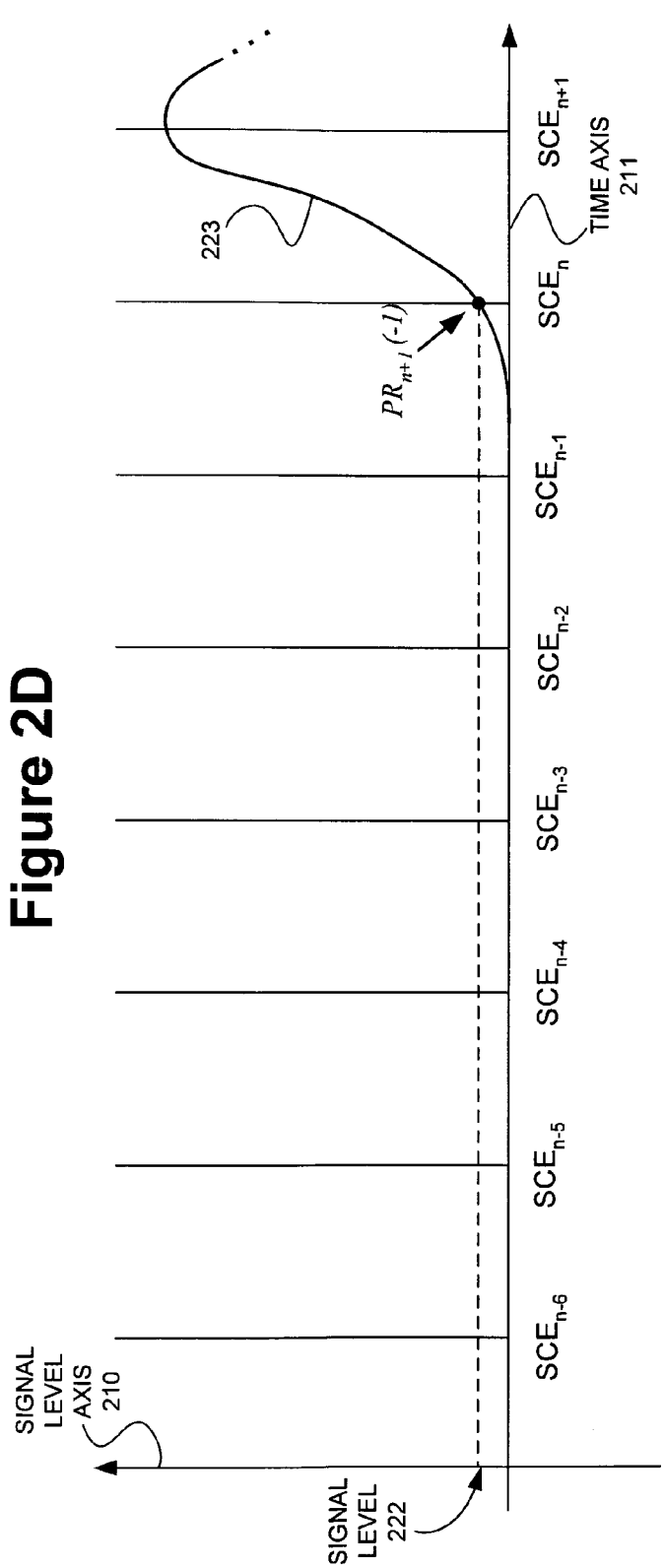

Given a pulse response 110, for example, the signal level of a symbol $D_n$ is influenced by the ISI of its six preceding symbols $D_{n-6}$ to $D_{n-1}$ and one of its following symbols $D_{n+1}$. The influence of symbol $D_{n-5}$, for example, upon $D_n$ is of magnitude PR[5]. This is illustrated by FIGS. 2A and 2B, which are arranged synchronously with respect to each other. Pulse response 221 of FIG. 2B is shown, by example symbol streams 201 and 202 of FIG. 2A, to represent $D_{n-5}$. Pulse response 221 is of magnitude PR[5] by the time $D_n$ occurs. The specific ISI effect of $D_{n-5}$ upon $D_n$ can be measured, and thus PR[5] measured, by measuring the average signal level of $D_n$ when only certain types of data streams occur. The influence of symbol $D_{n+1}$, as another example, upon $D_n$ is of magnitude PR[−1]. This is illustrated by FIGS. 2C and 2D, which are arranged synchronously with respect to each other. Pulse response 223 of FIG. 2D is shown, by example symbol streams 203 and 204 of FIG. 2C, to represent $D_{n+1}$. Pulse response 223 is of magnitude PR[−1] when $D_n$ occurs.

Expressed more generally, the specific ISI effect of any $D_{n-k}$ upon $D_n$ can be measured, and thus any PR[k] measured, by measuring the average signal level of $D_n$ when only certain types of data streams occur.

For a continuous stream of arbitrary data, a value of the array PR[k] can be determined, as follows, from the signal levels of the symbols received. It will be assumed that the stream of received data is input to a FIFO organized according to stream 103 of FIG. 1B. A data slicer or slicers, for detecting the correct value of each symbol received, can provide the input to the FIFO's first location. With each new input to the FIFO's first location, the symbols already in the FIFO shift towards the FIFO's last location. Between the first and last locations of the FIFO is the "present" symbol referred to herein as $D_n$. Symbols in the FIFO that are located before $D_n$ (i.e., they are closer to the FIFO's first location than $D_n$), are referred to as $D_{n-x}$. Symbols in the FIFO that are located after $D_n$ (i.e., they are closer to the FIFO's last location than $D_n$), are referred to as $D_{n+x}$. $D_n$ differs from the other FIFO symbols, that are before or after it, in that the signal level of $D_n$ can be measured with an additional adjustable slicer referred to herein as an "error slicer."

A general notation, for representing subsets of the symbols $D_n$, is as follows. Assume the FIFO has "before_$D_n$" locations before $D_n$ and "after_Dn" locations after $D_n$. Specifying a subset of symbols $D_n$, in terms of every location of the FIFO having a particular symbol type, can be expressed as follows:

$\{D_n:$ $D_{n-before\_Dn}$=symbol_type_indicator$_{n-before\_Dn}$, $D_{n-(before\_Dn-1)}$=symbol_type_indicator$_{n-(before\_Dn-1)}$, ...

$D_{n-1}$=symbol_type_indicator$_{n-1}$, $D_n$=symbol_type_indicator$_n$, $D_{n+1}$=symbol type_indicator$_{n+1}$, ...

$D_{n+after\_Dn}$=symbol_type_indicator$_{n+after\_Dn}\}$

Where the symbol stream is binary, each "symbol_type_indicator" can be of value 1 or 0.

The above set subset specification, for a FIFO with 6 locations before $D_n$ and 1 location after $D_n$, is as follows:

$\{D_n:$ $D_{n-6}$=symbol type_indicator$_{n-6}$, $D_{n-5}$=symbol_type_indicator$_{n-5}$, $D_{n-1}$=symbol_type_indicator$_{n-1}$, $D_n$=symbol_type_indicator$_n$, $D_{n+1}$=symbol_type_indicator$_{n+1}\}$ In general, determining whether the pattern in the FIFO meets certain criteria, for being a member of a subset, can also be referred to herein as "masking" the FIFO for the criteria sought. Finding the average signal level of a subset by, for example, appropriately adjusting an error slicer, can be represented by application of an Adjustable Slicer Level (ASL) function to the subset. In equation form, such application of ASL can be represented by prefixing a subset specification with "ASL." For the subset specification given just above, for example, this is as follows:

ASL$\{D_n:$ $D_{n-6}$=symbol_type_indicator$_{n-6}$, $D_{n-5}$=symbol_type_indicator$_{n-5}$, ...

$D_{n-1}$=symbol_type_indicator$_{n-1}$, $D_n$=symbol_type_indicator$_n$, $D_{n+1}$=symbol_type_indicator$_{n+1}\}$ A discussion of how an error slicer can be used to measure the average signal level of a subset is discussed in the below section 1.1: "Average Signal Level Determination."

Using the above-defined notation, PR[0] can be found by solving the following equation:

$$PR[0]=ASL\{D_n:D_n=1\} \qquad \text{Equation 1.1}$$

ASL $\{D_n:D_n=1\}$ represents the average signal level for when the present ($D_n$) received binary symbols have a value of one and there are no restrictions as to the values of any other symbols. An example application of equation 1.1 is shown in FIGS. 3A and 3B. Discussion of FIGS. 3A and 3B is included in the below section 1.2: "Example PR[0]."

PR[k], where k is not zero, can be found by the following equation:

$$PR[k]=(ASL\{D_n:D_n=1\})-(ASL\{D_n:D_n=1,D_{n-k}=1\}) \qquad \text{Equation 1.2}$$

An example application of equation 1.2 is discussed in section 1.3: "Applying Equation 1.2 to Find PR[k]." Note that when equation 1.2 is used to find a value for PR where k is less than zero, the second subset of equation 1.2 specifies a FIFO location after $D_n$, since the limitation $D_{n-k}=1$ becomes $D_{n+k}=1$.

PR[k], where k is not zero, can also be found by the following:

$$PR[k]=[(ASL\{D_n:D_n=1, D_{n-k}=1\})-(ASL\{D_n:D_n=1, D_{n-k}=0\})]/2 \qquad \text{Equation 1.3}$$

An example application of equation 1.3 is discussed below in section 1.4: "Applying Equation 1.3 to Find PR[k]." Equation 1.3 can have an advantage of greater signal-to-noise ratio than equation 1.2, since the "signal" from which PR[k] is determined in equation 1.3 (i.e., the difference between ASL$\{D_n:D_n=1, D_{n-k}=1\}$ and ASL $\{D_n:D_n=1, D_{n-k}=0\}$) is twice as large as that used in equation 1.2.

With regard to equation 1.3, symbol $D_{n-k}$, which is first masked for value 1 in subset $\{D_n:D_n=1, D_{n-k}=1\}$, and is then masked for value 0 in subset $\{D_n:D_n1, D_{n-k}=0\}$, can be referred to as the "toggle bit."

In addition to holding the masked-for value of $D_n$ constant, in both subsets of equation 1.3, it can also be desirable to hold other symbol positions constant. For example, the following is a possible optimization of equation 1.3:

$$PR[k]=[(ASL\{D_n:D_n=1, D_{n-1}=1, D_{n-k}=1\})-(ASL\{D_n: D_n=1, D_{n-1}=1, D_{n-k}=0\})]/2 \quad \text{Equation 1.4}$$

Since $D_{n-1}$ can be the single symbol generating the largest source of ISI effecting $D_n$, it can be desirable to mask for only those subsets where the effect of $D_{n-1}$, on $D_n$, is held constant.

1.1. Average Signal Level Determination

For a binary symbol stream, represented by a differential signal, the ideal signal levels used can be represented as +1 and −1. A signal level of +1 can represent the binary one symbol while signal level −1 can represent a binary zero.

A data slicer, for detecting the correct value for each binary symbol received, can have its threshold set at a signal level of 0. The output of the data slicer can be input to the FIFO that is used for subset specification.

The data slicer can be constructed to input a 1 symbol to the FIFO if the signal input to it is above its threshold and to input a 0 symbol to the FIFO if the signal input to it is below its threshold.

While a binary stream can be ideally represented by the signal levels +1 and −1, actual signal levels will vary, due to ISI, and it is the variance of such signals, for $D_n$, that can be measured by an error slicer with an adjustable threshold.

Application of the function "ASL" to a subset can be accomplished by using an error slicer to test the actual signal levels of the subset. If the error slicer is tested with respect to a subset of sufficient size, and the error slicer is adjusted appropriately with respect to such testing, the error slicer can be made to converge on the average signal level of the symbols included in the subset.

For example, the subset whose ASL is to be determined can be divided into "t" sub-subsets, referred to herein as follows: $s\_subset_1$, $s\_subset_2$, $s\_subset_t$. An arbitrary one, of the "t" sub-subsets, can be referred to herein as $s\_subset_i$. The error slicer can be constructed to output a numerical value of +1 if the signal input to it is above its threshold and to output a numerical value of −1 if the signal input to it is below its threshold. Over the course. of each $s\_subset_i$, the threshold of the error slicer can be held constant. The output of the error slicer, for each element of an $s\_subset_i$, can be accumulated in a variable referred to herein as "e_to_s_corr."

If the threshold of the error slicer is set at the average signal level of a subset, then, for each $s\_subset_i$ its e_to___corr sum will tend to be close to zero. However, if, the error slicer threshold is higher than the average signal level, during the course of receiving any particular $s\_subset_i$, the e_to_s_corr sum will tend to be less than zero. If the error slicer threshold is lower than the average signal level, during the course of receiving any particular $s\_subset_i$, the e_to_s corr sum will tend to be greater than zero.

Convergence on the average signal level can be accomplished as follows. If, for a particular $s\_subset_i$, e_to_s_corr is less than zero, the error slicer's threshold can be decreased by an amount that shall be referred to herein as "ES_DELTA." If, for a particular $s\_subset_i$, e_to_s_corr is greater than zero, the error slicer's threshold can be increased by an amount that shall be referred to herein as "ES_DELTA." Provided that a sufficient number of s_subsets are considered, the error slicer's threshold will be incrementally adjusted, in ES_DELTA amounts, until it reaches the average signal level.

Depending upon the particulars of the convergence process used, the magnitude of ES_DELTA need not be fixed, but can be a function of the state of the convergence process.

1.2. Example PR[0]

FIG. 3A shows an example "data eye" for $D_n$, where the symbol stream is binary. A data eye of this type can be produced, for example, with a DSO. The temporal extent of the data eye is that of a single binary symbol with the center of the data eye being the time point at which a binary symbol $D_n$ is sampled, by an $SCE_n$, to determine its data content.

The data eye has a binary one region which, in general, is any signal trace above level DS 330 as of the time of $SCE_n$. In FIG. 3A, all traces above level DS 330 are depicted as being further limited to being between traces 320 and 321. The binary zero region of the data eye is, in general, any signal trace below level DS 330 as of the time of $SCE_n$. In FIG. 3A, all traces below level DS 330 are depicted as being further limited to being between traces 322 and 323. These regions are due to inter-symbol interference as well as other noise sources. The binary one region includes all traces for which a binary "1" is received, while the binary zero region includes all traces for which a binary "0" Is received.

Level DS 330, of FIG. 3A, indicates the threshold of a data slicer at the time of $SCE_n$. A data slicer whose threshold is set to level DS 330 correctly determines whether a symbol is a "1" or a "0" since traces that transmit a binary "1" are above level DS 330 and traces that transmit a binary "0" are below level DS 330.

FIG. 3B is the same as FIG. 3A, except the cross-hatching, between traces 320 and 321 and between traces 322 and 323, has been removed from FIG. 3B. The cross-hatching of FIG. 3A is there to emphasize the region of binary one traces between 320 and 321 and the region of binary zero traces between 322 and 323.

The average binary one signal level for $D_n$, with $D_n$ masked in accordance with equation 1.1, is indicated in FIG. 3B as level ES 331.

1.3. Applying Equation 1.2 to Find PR[k]

FIG. 4A shows the same data eye as depicted in FIG. 3B, except that only a subset of the signal traces of FIG. 3B are shown. In particular, FIG. 4A shows only those signal traces for $D_n$ when $D_{n-k}$ is of symbol type one. In this example it will be assumed that when $D_{n-k}$ is of symbol type one it produces constructive interference. Because FIG. 4A shows only those signal traces where $D_{n-k}$ provides constructive interference to $D_n$, we can expect the average signal levels in FIG. 4A, for both the binary one and binary zero regions, to be higher than in FIG. 3B. The binary one region of FIG. 4A is between traces 420 and 421, while the binary zero region is between traces 423 and 422.

The average signal level for the binary one region of FIG. 4A, at the time of $D_n$, is indicated as level ES 431.

The difference between ES 431 and ES 331 is PR[k].

A possible relationship, between traces 420 and 421 of FIG. 4A and traces 320 and 321 of FIG. 3B is as follows. Trace 420 can be of approximately the same trajectory as trace 320, while trace 421 can track a higher trajectory than 321.

Similarly, a possible relationship, between traces 423 and 422 of FIG. 4A and traces 323 and 322 of FIG. 3B is as follows. Trace 423 can be of approximately the same trajectory as trace 323, while trace 422 can track a higher trajectory than 322.

1.4. Applying Equation 1.3 to Find PR[k]

FIG. 4B shows the same data eye as depicted in FIG. 3B, except that only a subset of the signal traces of FIG. 3B are shown. In particular, FIG. 4B shows only those signal traces for $D_n$ when $D_{n-k}$ is of symbol type zero. In this example it will be assumed that when $D_{n-k}$ is of symbol type zero it produces destructive interference. Because FIG. 4B shows only those signal traces where $D_{n-k}$ provides destructive interference to $D_n$, we can expect the average signal levels in FIG. 4B, for both the binary one and binary zero regions, to be lower than in FIG. 3B. The binary one region of FIG. 4B is between traces 430 and 431, while the binary zero region is between traces 433 and 432.

The average signal level for the binary one region of FIG. 4B, at the time of $D_n$, is indicated as level ES 432.

PR[k] can be found by the following formula:

(level of ES 431–level of ES 432)/2

A possible relationship, between traces 431 and 430 of FIG. 4B and traces 321 and 320 of FIG. 3B is as follows. Trace 431 can be of approximately the same trajectory as trace 321, while trace 430 can track a lower trajectory than 320.

Similarly, a possible relationship, between traces 432 and 433 of FIG. 4B and traces 322 and 323 of FIG. 3B is as follows. Trace 432 can be of approximately the same trajectory as trace 322, while trace 433 can track a lower trajectory than 323.

2. Application to Non-Binary Data

The techniques of the above sections, while presented primarily in terms of application to binary symbol streams, can be readily applied to non-binary symbol streams.

For example, the techniques of the above section can be applied to PAM4 as follows.

For a PAM4 symbol stream, represented by a differential signal, the ideal signal levels used can be represented as: +3, +1, −1, −3. The signal levels +3, +1, −1, −3 can represent (are mapped to), respectively, the following 2-bit binary values: 11, 10, 01, 00. To detect each of these symbols, three data slicers can be used, with their thresholds set at: +2, 0, −2.

The same equations 1.1 to 1.4, presented above for binary, can also be applied, at the same signal levels, to a PAM4 symbol stream provided that certain symbol_type_indicator substitutions are made: symbol 10 (of signal level +1 in PAM4) is substituted for binary 1 (of signal level +1 in binary) and symbol 01 (of signal level −1 in PAM4) is substituted for binary 0 (of signal level −1 in binary). Thus, equations 1.1 to 1.4 become, respectively, equations 2.1 to 2.4 as shown below:

$$PR[0]=ASL\{D_n:D_n=10\} \quad \text{Equation 2.1}$$

$$PR[k]=(ASL\{D_n:D_n=10\})-(ASL\{D_n:D_n=10,D_{n-k}=10\}) \quad \text{Equation 2.2}$$

$$PR[k]=[(ASL\{D_n:D_n=10, D_{n-k}=10\})-(ASL\{D_n:D_n=10, D_{n-k}=01\})]/2 \quad \text{Equation 2.3}$$

$$PR[k]=[(ASL\{D_n:D_n=10, D_{n-1}=10, D_{n-k}=10\})-(ASL\{D_n:D_n=10, D_{n-1}=10, D_{n-k}=01\})]/2 \quad \text{Equation 2.4}$$

Because PAM4 has additional signal levels, however, an alternate set of equations that can be used is as follows.

An equation 2.5 for finding PR[0] is as follows:

$$PR[0]=ASL\{D_n:D_n=11\} \quad \text{Equation 2.5}$$

A pair of equations 2.6 and 2.7, for finding PR[k], where k is not zero, are as follows:

$$PR[k]=(ASL\{D_n:D_n=11\})-(ASL\{D_n:D_n=11, D_{n-k}=11\}) \quad \text{Equation 2.6}$$

$$PR[k]=[(ASL\{D_n:D_n=11, D_{n-k}=1\})-(ASL\{D_n:D_n=11, D_{n-k}=00\})]/2 \quad \text{Equation 2.7}$$

Equations 2.5 to 2.7 differ from 2.1 to 2.3 in substituting the symbol 11 (with a signal level +3) for the symbol 10 (with a signal level of +1), and in substituting the symbol 00 (with a signal level −3) for the symbol 01 (with a signal level of −1). Equations 2.5 to 2.7 can have a superior signal-to-noise ratio to equations 2.1 to 2.3 since the signal levels used are three times greater.

Equation 2.1 can be used in conjunction with either of equations 2.6 or 2.7, however, due to the differing signal levels used, scaling of PR[0], or of the PR[k] values, is necessary. Specifically, either the PR[0] value can be multiplied by 3, or the PR[k] values can each be multiplied by ⅓.

Equation 2.5 can be used in conjunction with either of equations 2.2 or 2.3, however, due to the differing signal levels used, scaling of PR[0], or of the PR[k] values, is necessary. Specifically, either the PR[0] value can be multiplied by ⅓, or the PR[k] values can each be multiplied by 3.

Other combinations of signal values can be chosen. In general, there are a total of 4 possible variations of equation 2.1: one for each of the four possible signal values of PAM4. Equation 2.2 has a total of 16 possible variations: 4 choices for the signal level of $D_n$ and, for each signal level chosen, 4 choices for the signal level of $D_{n-k}$. Equation 2.3 has a total of 28 possible variations: 4 choices for the signal level of $D_n$ and, for each signal level chosen, 7 choices for a pair of differing signal levels for assignment to each $D_{n-k}$. Scaling factors for these variations can be determined, where necessary, as a straightforward extension of the above discussion.

While this section has focused on PAM4, the techniques discussed herein can be readily applied to any other type of symbol stream.

Determination of the average signal level of a subset, in PAM4 or any other type of symbol stream, can be accomplished by the same technique described in the above section 1.1: "Average Signal Level Determination."

3. Pseudocode

A pseudocode procedure, for finding an array PR[k] from binary data, is shown in FIGS. 6A-6I. FIGS. 6A-6I represent a particular example and all the values used in FIGS. 6A-6I are merely representative. FIGS. 6A-6I present pseudo-code loosely based on the C programming language. The C programming language is described in such texts as "A Book on C," by A. Kelley and 1. Pohl, Benjamin Cummings Pub. Co., Third Edition, 1995, ISBN 0-8053-1677-9, herein incorporated by reference in its entirety.

FIG. 6A contains definitions for various symbolic constants using the "#define" command of the C programming language's preprocessor. Each #define associates a symbolic name with a value. For example, the first #define (see line 4) associates the symbolic name "PR_F_POINTS" with the number "7." In the following pseudocode, of FIGS. 6B to 6I, wherever the string "PR_F_POINTS" appears, the value "7" is substituted prior to any "execution" of the pseudocode. The particular constant values assigned in FIG. 6A are for purposes of example only.

FIG. 6B presents declarations for various global variables that are used in the following pseudocode of FIGS. 6C to 6I.

Figure 2E:
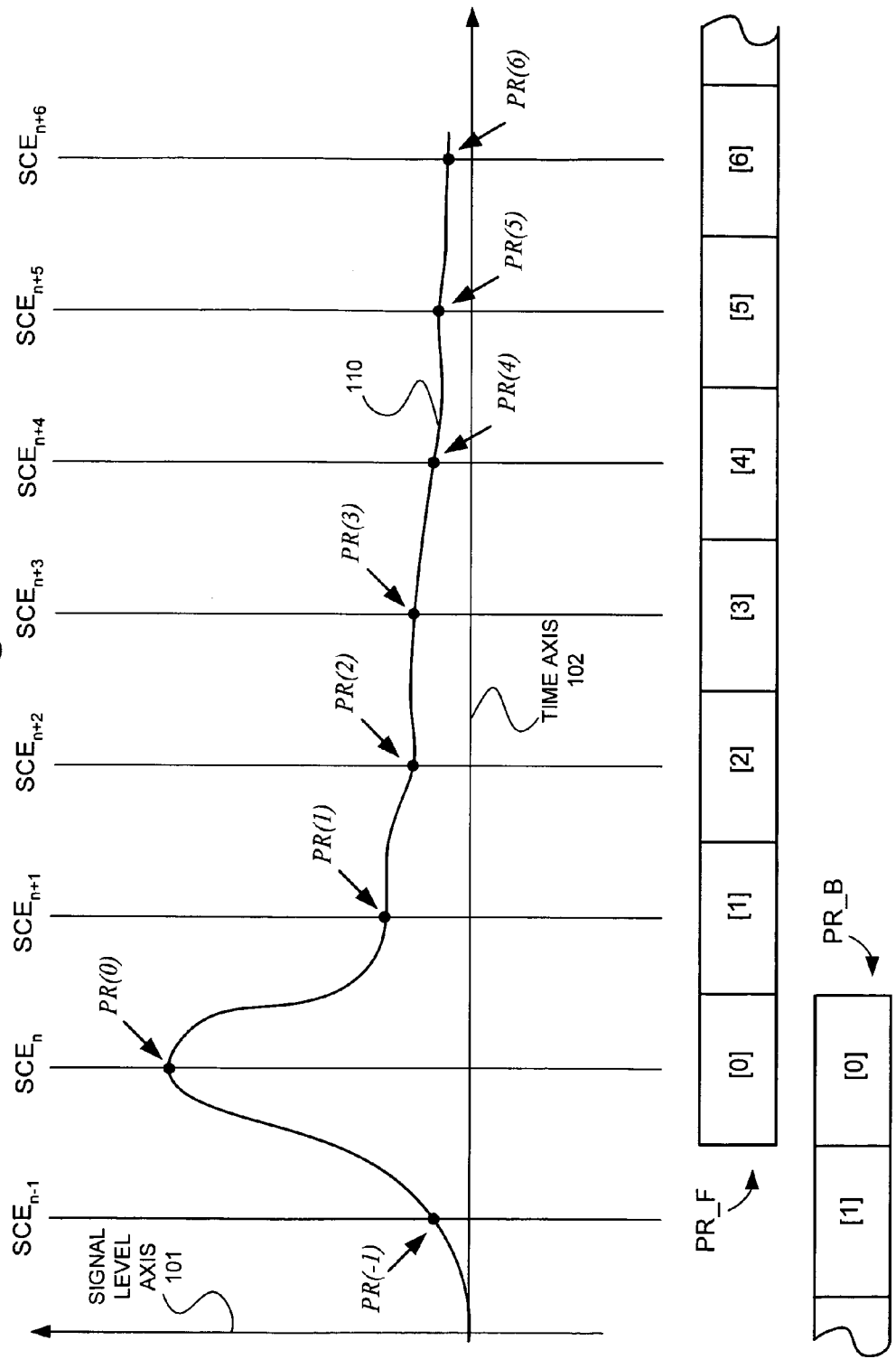
FIG. 2E shows the relationship of the PR_F and PR_B arrays to the PR array.

The pulse response array PR is represented in the pseudocode by two arrays defined in FIG. 6B: PR_F (line 6) and PR_B (line 12). PR_F is used to hold PR[0] and all values PR[k] where k is greater than zero. PR_B is used to hold all values PR[k] where k is less than zero. The relationship of the PR_F and PR_B arrays to PR is shown graphically in FIG. 2E.

The actual analog threshold of an error slicer can be controlled by the value of the variable error_slicer_thresh (FIG. 6B, line 15), typically through a Digital to Analog Converter (DAC).

Figure 2F:
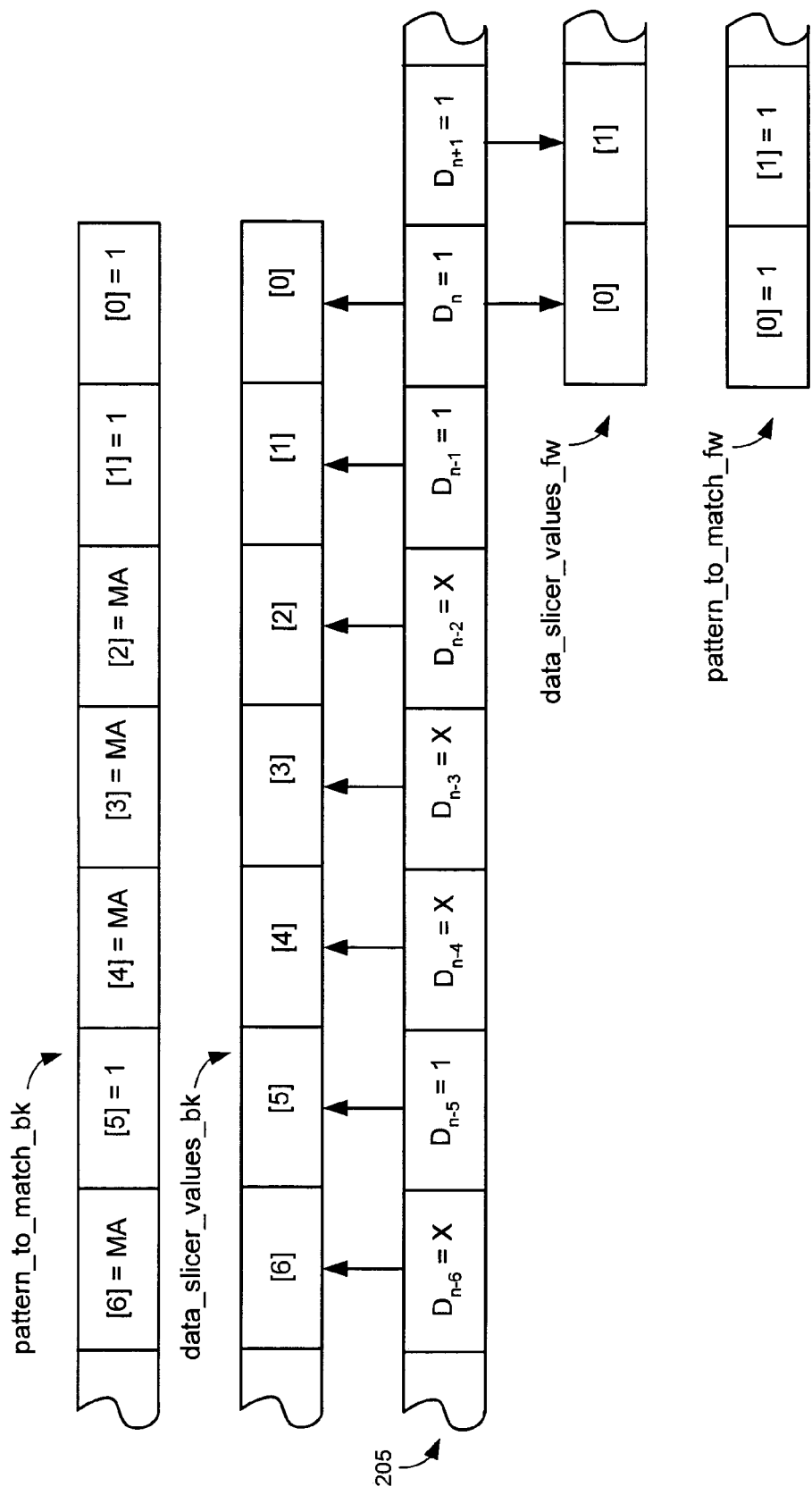
FIG. 2F illustrates how the symbol stream to be processed is represented in the pseudocode by two arrays: data_slicer_values_bk and data_slicer_values_fw.

The symbol stream to be processed is represented in the pseudocode by two arrays defined in FIG. 6B:

data_slicer_values_bk (line 25) and data_slicer_values_fw (line 26). The relationship of these two arrays to a symbol stream 205 is illustrated in FIG. 2F. Symbol stream 205 can be a FIFO, with data entering on the end with $D_{n-6}$ and moving towards the end with $D_{n+1}$. When a pseudocode function called "wait_for_symbol_clock" (see FIG. 6G, line 16) is executed, it waits for an appropriate symbol clock occurrence and then loads a portion of the FIFO into data_slicer_values_bk and data_slicer_values_fw. This loading operation is indicated in FIG. 2F by the arrows from symbol stream 205 to data_slicer_values_bk and data_slicer_values_fw.

Also loaded, in response to an execution of wait for_symbol_clock, is the value of an error slicer into error_slicer_value (declared in FIG. 6B at line 27).

Figure 2G:
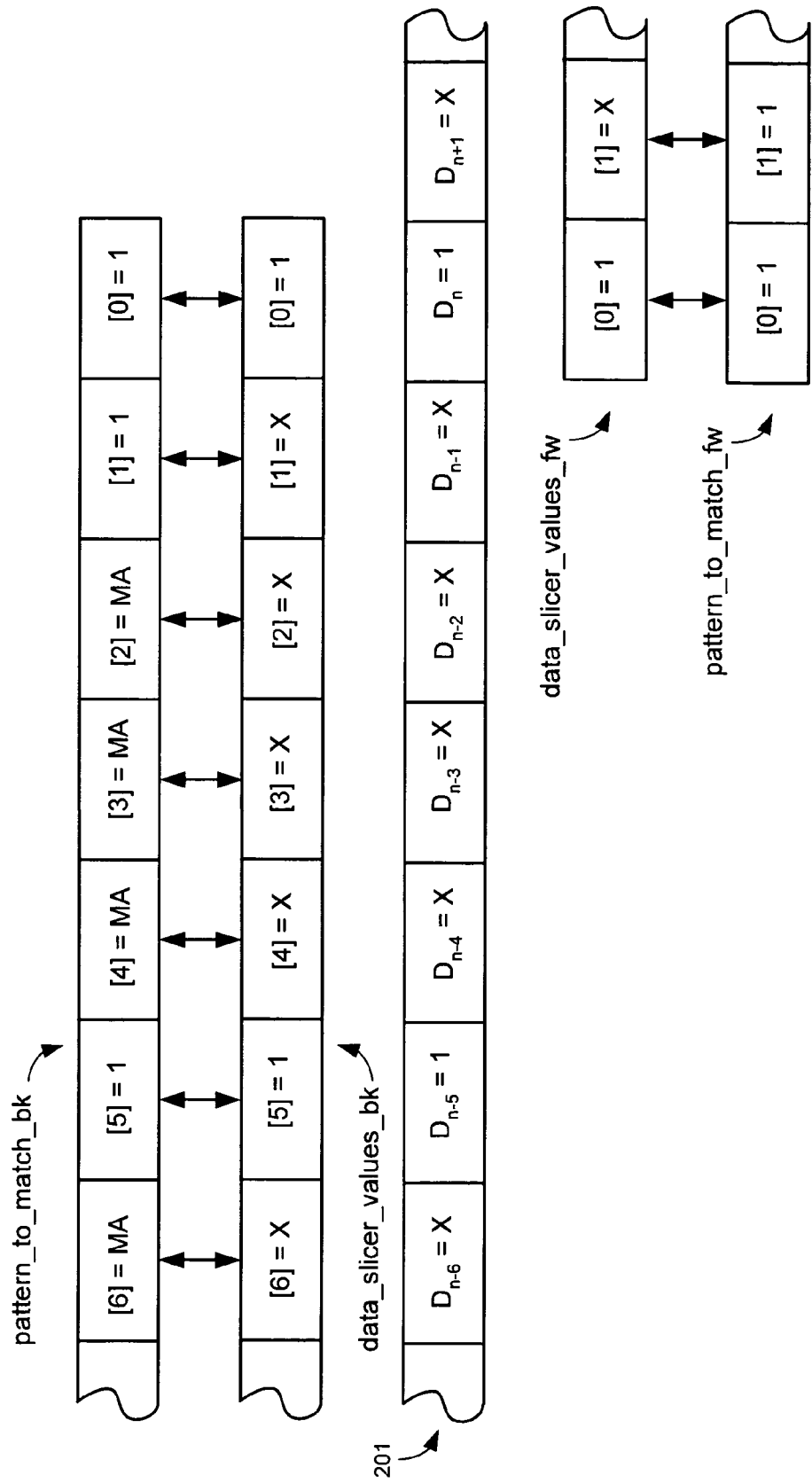
FIG. 2G illustrates how pattern_to_match_bk is matched against data_slicer_values_bk and pattern_to_match_fw is matched against data_slicer_values_fw.

Also declared in FIG. 6B are the arrays pattern_to_match_bk (line 33) and pattern_to_match_fw (line 34). pattern_to_match_bk is matched against the contents of data_slicer_values_bk and pattern_to_match_fw is matched against the contents of data_slicer_values_fw. This matching operation is illustrated in FIG. 2G by the bidirectional arrows. Whether a match occurs depends upon whether the elements of pattern_to_match_bk and pattern_to_match_fw, that do not contain the value "MA," match the corresponding element of, respectively, data_slicer_values_bk and data_slicer_values_fw. A match does not depend upon those elements with the value "MA" (which stands-for "Match Any") since the MA value is defined to match any value in the corresponding element of data_slicer_values_bk or data_slicer_values_fw.

FIG. 6C presents two top-level loops: one that determines values for PR_F (lines 1-3) and another (lines 4-6) that determines values for PR_B. Each loop operates by repeatedly calling the procedure "find_PR_value." For each call to find_PR_value, a pulse response value is determined. The pulse response value determined is selected by the two parameters. The first parameter "k" to find_PR_value, when expressed in terms of a single PR array rather than in terms of the two separate pseudocode arrays PR_F and PR_B, specifies that either PR[k] or PR[−k] is determined. The second parameter to find_PR_value chooses whether PR[k] or PR[−k] is determined. If the second parameter is passed value "1," then PR[k] is determined, while if the second parameter is passed value "0" then PR[−k] is determined.

FIG. 6D presents a definition for the procedure find_PR_value, that operates as follows. First find_PR_value tests whether PR[0] is to be determined (line 6).

If the pulse response value to be found is not PR[0] (i.e., a PR[k], for k other than zero, is to be found), find_PR_value operates as follows.

A procedure "adjust_error_slicer" is used (see the calls to adjust_error_slicer at lines 15 and 24), that adjusts the threshold of the error slicer. The error slicer threshold is adjusted by setting the value of the global variable "error_slicer_thresh." For the subset of traces defined by the masks, adjust_error_slicer adjusts the threshold of the error slicer such that half the traces are above the threshold and half are below. The parameters to adjust_error_slicer determine the particular subset (mask) of binary traces to which the error slicer is adjusted. The parameter "k" indicates that the traces for $D_n$, included in the subset, are those where $D_{n-k}$ or $D_{n+k}$ is masked for the value indicated by the third parameter to adjust_error_slicer (where the third parameter, at line 1 of the adjust_error_slicer definition, is called "symbol to_hold_to"). The "dir" parameter to adjust error_slicer decides whether the masking is done for $D_{n-k}$ or $D_{n+k}$.

adjust_error_slicer is first called (see FIG. 6D, line 15) with its parameters set such that regardless of whether it is $D_{n-k}$ or $D_{n+k}$ that is being masked for, it must be a binary one. The result of the first call to adjust_error_slicer is stored in the variable "signal_level1" (line 19).

Next, adjust_error_slicer is called (see FIG. 6D, line 24) with its parameters set such that regardless of whether it is $D_{n-k}$ or $D_{n+k}$ that is being masked for, it must be a binary zero. The result of the second call to adjust error_slicer is stored in the variable "signal_level0" (line 28).

While the above two steps describe adjust_error_slicer as first being called with $D_{n-k}$ or $D_{n+k}$ being restricted to one, and then $D_{n-k}$ or $D_{n+k}$ being restricted to zero, the ordering of the two steps is immaterial.

Finally, adjust_error_slicer determines the value for PR[k] from signal_level1 and signal_level0 (lines 30-33). The calculation of PR[k] from signal_level1 and signal_level0 is the same regardless of the value of the "dir" parameter (formula for PR_F[k] on line 31 is the same as for PR_B[k] on line 33). The "dir" or direction parameter simply decides whether the pulse response value is stored in the PR_F array or the PR_B array.

find_PR_value finds PR[0] value as follows. adjust_error_slicer is called (see FIG. 6D, line 37) with its parameters set such that any trace for which $D_n$ is equal to a binary one is included, regardless of the value of any prior or subsequent bit. The result of the call to adjust_error_slicer is PR[0] and its value is implicitly stored in the variable "error_slicer_thresh." The "dir" parameter simply decides whether the value for PR[0] is stored in the PR_F array or the PR_B array. Rather than test "dir," the particular pseudocode of FIG. 6D uses the approach of always storing PR[0] in both PR_F[0] (by line 38) and PR_B[0] (by line 39).

Pseudocode for adjust_error_slicer is shown in FIGS. 6E and 6F. adjust error_slicer begins by initializing pattern_to_match_bk and pattern_to_match_fw to match any symbol at all of their positions (see FIG. 6E, lines 10-13). Next, the "dir" parameter is tested (line 15) to determine whether to mask for $D_{n-k}$ or $D_{n+k}$.

If "dir" is value "1," then $D_{n-k}$ is selected for masking. Masking for $D_{n-k}$ being of the value of the parameter "symbol_to_hold_to" is accomplished by setting element pattern_to_match_bk[k] to the value of symbol_to_hold_to (see line 23).

In addition to masking for $D_{n-k}$, adjust_error_slicer is "hard wired" to mask for $D_n$ being of value "1" by setting element pattern_to_match_bk[0] to the value "1" (see line 19). Note that the value for $D_n$ could equally have been chosen to be "0".

Other than masking for $D_n$ and $D_{n-k}$, adjust_error_slicer can optionally mask for other bits as well. It can be particularly helpful, for example, to mask such that $D_{n-1}$ is always at a constant value, such as 1 (see FIG. 6E, line 32). This is because $D_{n-1}$ can be the symbol that acts as the largest single source of ISI and therefore can have a significant effect on the accuracy of a value for PR[k], as determined by adjust_error_slicer, where k is not zero or one.

If "dir" is value "0," then $D_{n+k}$ is selected for masking. Masking for $D_{n+k}$ being of the value of the parameter "symbol to_hold_to" is accomplished by setting element pattern_to_match_fw[k] to the value of symbol to_hold_to (see FIG. 6F, line 9).

In addition to masking for $D_{n+k}$, adjust_error_slicer is "hard wired" to mask for $D_n$ being of value "1" by setting element pattern_to_match_fw[0] to the value "1" (see line 5).

Other than masking for $D_n$ and $D_{n+k}$, adjust_error_slicer can optionally mask for other bits as well. It can be particularly helpful, for example, to mask such that $D_{n-1}$ is always at a constant value, such as 1 (see FIG. 6F, line 18). This is because $D_{n-1}$ can be the symbol that acts as the largest single source of ISI and therefore can have a significant effect on the accuracy of a value for PR[k], as determined by adjust_error_slicer, where k is not zero or one.

Once pattern_to_match_bk and pattern_to_match_fw have been appropriately programmed, adjust_error_slicer begins a loop to adjust error_slicer_thresh a number of times determined by the value of NUM_ES_ADJS (see loop of FIG. 6F, lines 26 to 35). For each iteration of the loop to adjust error_slicer_thresh, the following operations are performed.

The procedure e_to_s_correlation is called (line 28). e_to_s_correlation determines the proximity of the error slicer's threshold to the average value for the selected subset of $D_n$ (the selected subset determined by the programming of pattern_to_match_bk and pattern_to_match_fw). Greater proximity can be indicated by e_to_s_correlation returning a value closer to zero. If the error slicer's threshold is below the average value for the selected subset of $D_n$, e_to_s_correlation can return a value greater than zero. In this case, the error slicer's threshold can be increased (see line 31). If the error slicer's threshold is above the average value for the selected subset of $D_n$, e_to_s_correlation can return a value less than zero. In this case, the error slicer's threshold can be decreased (see line 34). The magnitude of the change to the error slicer's threshold is determined by ES_DELTA. For purposes of example, ES_DELTA has been set to a magnitude of 1 mV (expressed in units of 0.1 mV).

Pseudocode for e_to_s_correlation is shown in FIG. 6G. e_to_s_correlation accumulates a metric over a number of values for $D_n$, that are members of the programmed-for subset, determined by NUM_SAMPLES_TO_ACCUM_OVER (see loop of FIG. 6G, lines 11-34). Each iteration of the loop of e_to_s_correlation operates as follows. wait_for_symbol_clock is executed (line 16), which waits for a symbol clock and then updates the following global variables: data_slicer_values_bk, data_slicer_values_fw and error_slicer_value.

The contents of data_slicer_values_bk is compared with pattern_to_match_bk by compare_bk (line 20).

The contents of data_slicer_values_fw is compared with pattern_to_match_fw by compare_fw (line 24).

If everything compared by compare_bk and compare_fw matches (which is tested-for by line 29), then a $D_n$ has been found that is a member of the programmed-for subset. The error slicer slicer, for such $D_n$, is accumulated (line 32) and the loop index is incremented (line 31).

Pseudocode implementations for compare_bk and compare_fw are shown, respectively, in FIGS. 6H and 6I.

4. Hardware Implementation

If implemented with appropriate hardware, such as described in this section, the techniques described herein, for determining the pulse response at a receiver, can be utilized without interrupting the normal operation of the receiver.

Figure 5A:
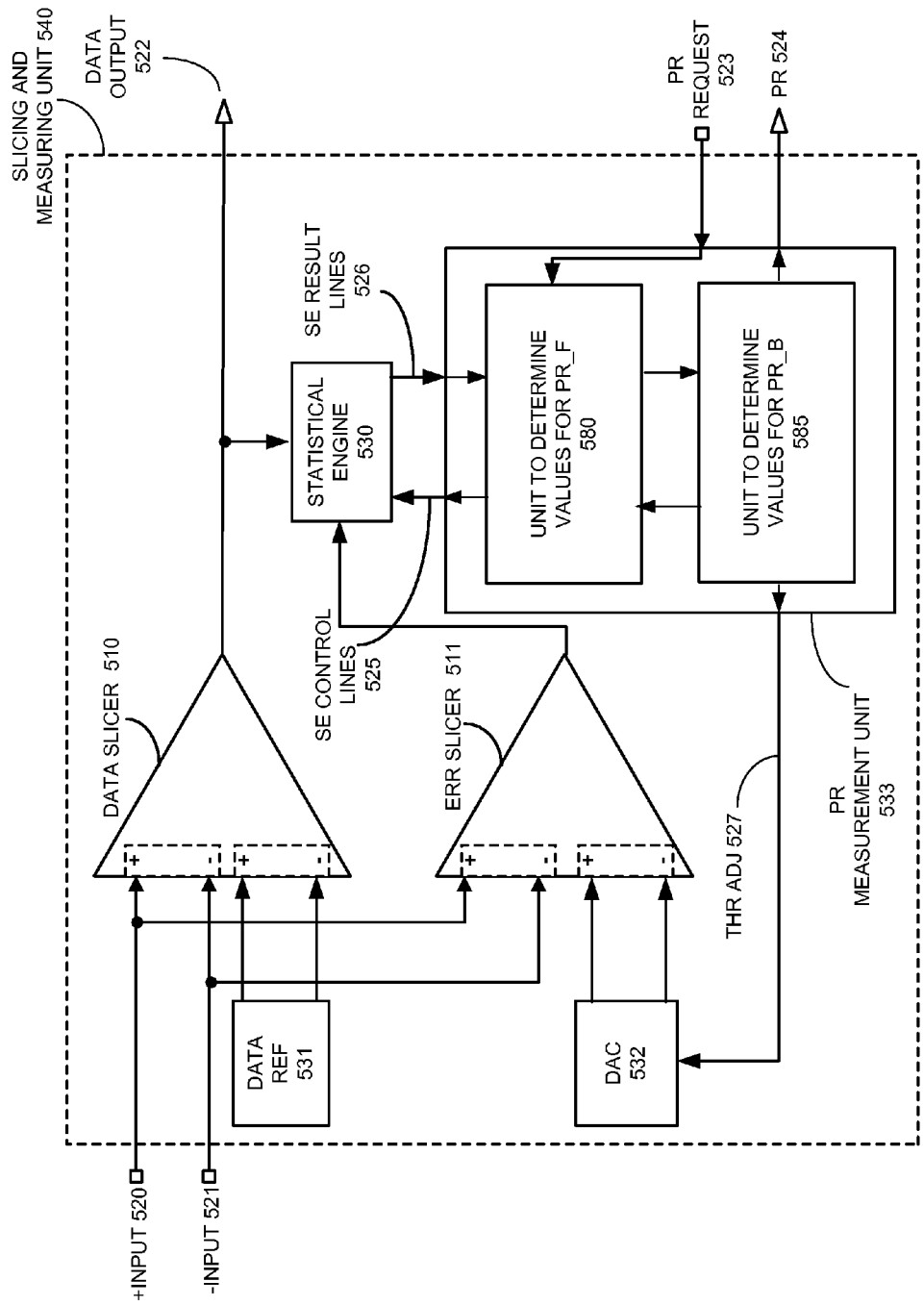
FIG. 5A, which shows a slicing and measuring unit 540 that can be incorporated as part of a receiver in a data transmission system.

An example hardware implementation for finding PR is depicted in FIG. 5A, which shows a slicing and measuring unit 540 that can be incorporated as part of a receiver in a data transmission system. Data output 522 can be coupled to any receiving system that needs to make use of the received data. For example, the receiving system can be a backplane transceiver or a hard disk drive controller.

Figure 5B:
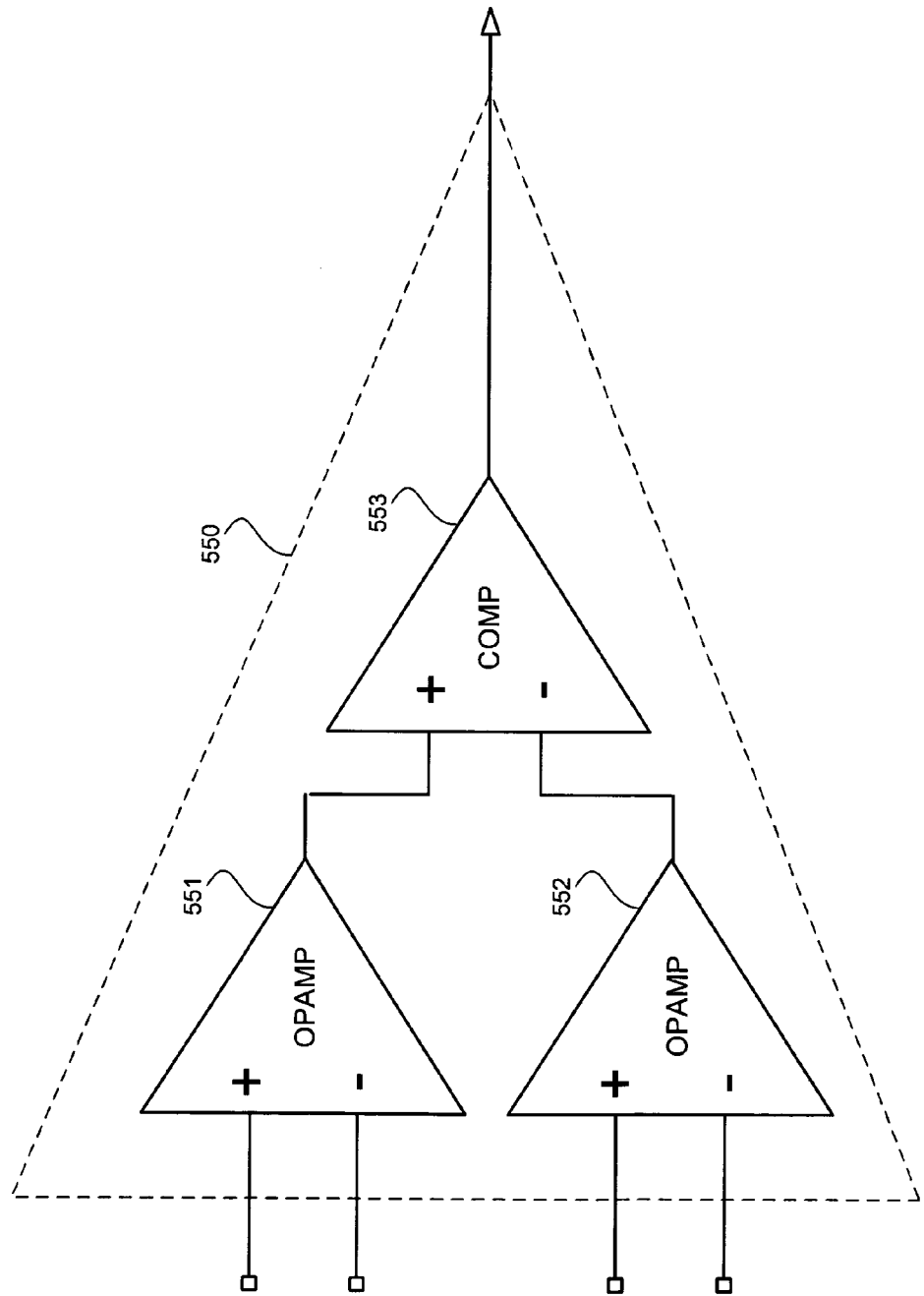
FIG. 5B depicts an implementation for a slicer.

Slicing and measuring unit 540 can comprise a data slicer 510 and an error slicer 511. A functional overview, of how each of data slicer 510 and error slicer 511 can be implemented, is shown in FIG. 5B. FIG. 5B depicts a slicer 550 comprised of operational amplifier ("opamp") 551, opamp 552 and comparator 553. Each opamp converts a differential input of the slicer into a single-ended signal. Comparator 553 compares the outputs of the two opamps to produce a logical output.

It can be advantageous to integrate data slicer 510 and error slicer 511 on the same, physically contiguous, integrated circuit. Advantages include a close matching of electrical characteristics between the data slicer 510 and error slicer 511. Also, in high speed data receivers, it can be advantageous to locate those components that operate at high speeds (e.g., at speeds that are at, or close to, the received data rate) in close physical proximity and, preferably, on the same, physically contiguous, integrated circuit.

Slicing and measuring unit 540 receives the signal, whose PR is to be measured, at the following differential inputs: positive input 520 and negative input 521. Data slicer 510 compares differential inputs 520 and 521 to a differential reference 531 (e.g., a voltage source). Error slicer 511 compares differential inputs 520 and 521 to an adjustable differential reference 532 (e.g., a DAC, where the output is a digitally adjustable voltage) that is controlled by ThrAdj 527.

Statistical engine 530 and PR measurement unit 533, together, can perform the functionality of the pseudocode of FIGS. 6B-6I. Statistical engine 530 is shown in FIG. 5A as receiving inputs from data slicer 510 and error slicer 511. PR measurement unit 533 provides input to statistical engine 530 over SE control lines 525. Statistical engine 530 provides input to PR measurement unit 533 over SE Result lines 526.

It can be advantageous for statistical engine 530, which can perform those tasks that require higher data processing speeds, to be integrated on the same integrated circuit as data slicer 510 and error slicer 511. An example functionality for statistical engine 530 is procedure e_to_s_correlation of FIG. 6G. SE control lines 525 can control functionality corresponding to the programming of the pattern_to_match_bk and pattern_to_match_fw arrays. SE result lines 526 can provide information back to PR measurement unit 533 corresponding to the functionality of the value of the e_to_s_corr sum being returned by the e_to_s_correlation procedure.

PR measurement unit 533 can perform functionality corresponding to the pseudocode of FIGS. 6C-6F (as shown in FIG. 5A as unit to determine values for PR_F 580 and unit determine values for PR_B 580). Specifically, starting the execution of the loops of FIG. 6C can correspond, in FIG. 5A, to the functionality of asserting input signal line "PR request 523." The loops of FIG. 6C storing the determined PR values, in the appropriate array PR_F or PR_B, can correspond, in FIG. 5A, to the determined PR array being provided on the output signal lines "PR 524." The setting of error_slicer_thresh, by the adjust_error_slicer procedure, can correspond, in FIG. 5A, to outputting a new value to control DAC 532 on the signal lines "Thr Adj 527." The functionality of PR measurement unit 533 can all be integrated on the same integrated circuit with data slicer 510 and error slicer 511, or it can be advantageous to implement some, or all, of the functionality on separate hardware.

For example, it can be advantageous to implement the functionality of procedure adjust_error_slicer on the same integrated circuit as data slicer 510 and error slicer 511.

As another example, it can be advantageous to implement the functionality of procedure find_PR_value on hardware separate from the integrated circuit implementing data slicer 510 and error slicer 511. It can be advantageous, for example, to implement the functionality of procedure find_PR_value with a separate, general purpose, microprocessor system programmed with appropriate software.

5. Glossary of Selected Terms
  DAC: Digital to Analog Converter.
  DSO: digital sampling oscilloscope.
  FIFO: a First In First Out queue.
  ISI: Inter-Symbol Interference.
  LPF: Low Pass Filter.
  Masking: Determining whether a symbol $D_n$ meets certain criteria for being a member of a subset can be referred to as "masking" $D_n$ for the criteria sought.
  PAM4: Pulse Amplitude Modulation, with 4 amplitude levels, for encoding symbols.
  PR: pulse response array.
  SCE: sample clock edge.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method for measuring a value of a pulse response at a receiver of a data transmission system, comprising:
  initializing a first pattern to match to any symbol for all elements of the first pattern to match;
  initializing a second pattern to match any symbol for all elements of the second pattern to match;
  adjusting the first pattern to match by replacing a first entry in the first pattern to match with a one value and replacing a second entry in the first pattern to match with a predetermined symbol;
  adjusting the second pattern to match by replacing a first entry in the second pattern to match with a one value and replacing a second entry in the second pattern to match with a predetermined symbol;
  supplying a received signal to a data slicer and an error slicer;
  masking for a first subset of data slicer values,
    wherein masking for the first subset of data slicer values involves matching the first subset of data slicer values, element by element, against the first pattern to match; and
    wherein an element of the first subset of data slicer values matches an element of the first pattern to match if the element of the first subset of data slicer values is identical to the element of the first pattern to match or the element of the first pattern to match is such that it matches any symbol;
  adjusting the error slicer threshold to a first average signal level of the first subset;
  masking for a second subset of data slicer values,
    wherein masking for the second subset of data slicer values involves matching the second subset of data slicer values, element by element, against the second pattern to match; and
    wherein an element of the second subset of data slicer values matches an element of the second pattern to match if the element of the second subset of data slicer values is identical to the element of the second pattern to match or the element of the second pattern to match is such that it matches any symbol;
  adjusting the error slicer threshold to a second average signal level of the second subset; and
  determining the value of the pulse response from the first and second average signal levels based on the masked first subset of data slicer values and the masked second subset of data slicer values.

2. The method of claim 1, wherein the step of masking for a first subset of data values further comprises:
  selecting a first data slicer value as a member of the first subset if it is indicative of a first symbol and a third data slicer value, temporally separated from the first data slicer value by a first amount related to the pulse response value to be determined, is indicative of a third symbol.

3. The method of claim 2, wherein the step of masking for a second subset of data values further comprises:
  selecting a second data slicer value as a member of the second subset if it is indicative of the first symbol.

4. The method of claim 3, wherein the step of masking for a second subset of data values further comprises:
  selecting a second data slicer value as a member of the second subset if a fourth data slicer value, temporally separated from the second data slicer value by the first amount, is indicative of a fourth symbol that is different from the third symbol.

5. The method of claim 1, wherein the step of adjusting the error slicer threshold to a first average signal level further comprises:
  summing error slicer values, corresponding to data slicer values that are members of the first subset, to produce a first sum;
  comparing the first sum to a first value; and
  adjusting the error slicer threshold in a direction dependent upon a result of the comparison.

6. The method of claim 1, wherein the error slicer is integrated on an integrated circuit and the data slicer is integrated on the same, physically contiguous, integrated circuit.

7. A system for measuring a value of a pulse response at a receiver of a data transmission system, comprising:
  a sub-system configured to initialize a first pattern to match any symbol for all elements of the first pattern to match;
  a sub-system configured to initialize a second pattern to match any symbol for all elements of the second pattern to match;
  a sub-system configured to adjust the first pattern to match by replacing a first entry in the first pattern to match with a one value and replacing a second entry in the first pattern to match with a predetermined symbol;
  a sub-system configured to adjust the second pattern to match by replacing a first entry in the second pattern to match with a one value and replacing a second entry in the second pattern to match with a predetermined symbol;
  a sub-system configured to supply a received signal to a data slicer and an error slicer;
  a sub-system configured to mask for a first subset of data slicer values,
    wherein masking the first subset of data slicer values involves matching the first subset of data slicer values, element by element, against the first pattern to match; and
    wherein an element of the first subset of data slicer values matches an element of the first pattern to match if the element of the first subset of data slicer values is identical to the element of the first pattern to match or the element of the first pattern to match is such that it matches any symbol;
  a sub-system configured to adjust the error slicer threshold to a first average signal level of the first subset;
  a sub-system configured to mask for a second subset of data slicer values, wherein masking for the second subset of data slicer values involves matching the second subset of data slicer values, element by element, against the second pattern to match; and wherein an element of the second subset of data slicer values matches an element of the second pattern to match if the element of the second subset of data slicer values is identical to the element of the second pattern to match or the element of the second pattern to match is such that it matches any symbol;

a sub-system configured to adjust the error slicer threshold to a second average signal level of the second subset; and a sub-system configured to determine the value of the pulse response from the first and second average signal levels based on the masked first subset of data slicer values and the masked second subset of data slicer values.

* * * * *

UNITED STATES PATENT AND TRADEMARK OFFICE
CERTIFICATE OF CORRECTION

PATENT NO. : 7,586,998 B1  Page 1 of 1
APPLICATION NO. : 10/978610
DATED : September 8, 2009
INVENTOR(S) : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this

Twenty-first Day of September, 2010

David J. Kappos
*Director of the United States Patent and Trademark Office*